United States Patent [19]

Roeder

[11] 4,088,328
[45] May 9, 1978

[54] O-RING SEAL ASSEMBLY FOR BOREHOLE PUMP ASSEMBLY

[76] Inventor: George K. Roeder, P.O. Box 4335, Odessa, Tex. 79760

[21] Appl. No.: 808,031

[22] Filed: Jun. 20, 1977

[51] Int. Cl.² .................. B65D 53/02; F04B 17/00
[52] U.S. Cl. ............................ 277/12; 277/124; 277/235 R; 92/250; 417/392; 277/181
[58] Field of Search ............... 277/181, 235 R, 9, 9.5, 277/12, 11, 124; 417/392, 404; 92/249, 250, 254

[56] References Cited

U.S. PATENT DOCUMENTS

| | | | |
|---|---|---|---|
| 3,009,722 | 11/1961 | Augustin | 277/235 X |
| 3,327,681 | 6/1967 | Hortvet | 277/124 X |
| 3,406,979 | 10/1968 | Weber | 277/235 X |
| 3,419,280 | 12/1968 | Wheeler | 277/124 X |
| 3,469,854 | 9/1969 | Linwood | 277/124 |

Primary Examiner—Robert S. Ward, Jr.
Attorney, Agent, or Firm—Marcus L. Bates

[57] ABSTRACT

An o-ring seal assembly in combination with a downhole pump and an o-ring collar. The seal assembly includes a special o-ring device and two coacting seal holding members which cooperate together to provide an o-ring groove, and which separate to enable an o-ring of this invention to be received therewithin. The special o-ring includes a resilient o-ring and a retainer. The o-ring has an annular face thereof bonded to a concave face formed on the retainer member. In one form of the invention the retainer member is in the form of a cylinder having an outer concave wall bonded to the inner annular face of the o-ring. In another embodiment of the invention, the retainer member is in the form of an apertured disc having an upper concave wall bonded to a lower annular face of the o-ring. The o-ring preferably is made of rubber or rubber-like material while the retainer member is made of metal and is vulcanized to the rubber o-ring. Since the retainer member is nonexpansible, the separable members which form the groove enable the o-ring and retainer member to be slidably received thereon and the separable members are thereafter assembled, thereby capturing the o-ring and retainer within the groove.

11 Claims, 7 Drawing Figures

U.S.Patent May 9, 1978 Sheet 2 of 2 4,088,328

O-RING SEAL ASSEMBLY FOR BOREHOLE PUMP ASSEMBLY

BACKGROUND OF THE INVENTION

Downhole hydraulic pumps of the free type employ a sealing means for packing off or separating the high pressure power fluid used to operate a subsurface hydraulic oil well pump. In particular, the seal is useful in conjunction with a free type pump which can be pumped or circulated downhole into seated relationship respective to an o-ring collar, and when it is necessary to retrieve the pump, pressure can be applied at the well head to force the pump back uphole to the surface of the ground.

In order to install a free type pump downhole in a borehole, it is necessary to flow the pump down the tubing string until an o-ring seal located on the pump body is sealingly received in the o-ring collar located at the lower end of the tubing string. This expedient separates the power oil from the produced fluid, and should the o-ring become damaged and leak, the two fluids naturally mix, whereupon great loss in efficiency is experienced, dependent upon the magnitude of the leakage.

When the pump is initially forced back uphole, the high pressure fluid located below the o-ring tends to cause the o-ring to flow out from its groove as the o-ring leaves its collar, thereby breaking the o-ring.

The above manipulations often damage the o-ring and eventually cause it to break so that it is free to fall into the bottom of the borehole where it is ingested into the pump, thereby causing malfunction and expensive repairs.

It would therefore be desirable to have made available an o-ring seal assembly for a free type downhole pump which is less liable to malfunction in the above manner, which will not roll upon itself as it becomes seated, and which is not liable to be pumped out of its groove as the pump is unseated. Furthermore, it is desirable to have made available means by which a broken o-ring will be retained within its groove rather than being ingested into the pump intake.

SUMMARY OF THE INVENTION

This invention relates to a seal assembly for a downhole pump. The seal assembly includes an o-ring and an o-ring retainer, with the retainer and o-ring being bonded together and captured within a special member which provides an o-ring groove.

More specifically the o-ring has a circumferentially extending annular face which is vulcanized to a concavity formed in one sidewall of the retainer. The retainer, in one of its forms, is a circular apertured disc having an upwardly directed concavity within which the o-ring is bonded.

In another of its embodiments, the o-ring has an inside annular face bonded to an outwardly directed concavity formed on a cylindrical retainer.

The o-ring assembly includes a first and second annular member which cooperate together to form an o-ring groove so that the first and second members can be parted to enable the o-ring and retainer to be received therewithin.

Accordingly, a primary object of this invention is to provide improvements in an o-ring assembly of the type used to seal off free type pumps.

Another object of this invention is the provision of improvements in o-ring assemblies which prevent the o-ring from rolling as the pump enters the o-ring collar of the bottom hole cavity.

Another object of this invention is the provision of a means by which an o-ring is maintained properly positioned within its o-ring groove as the pump is forced uphole and out of the o-ring collar.

Still another object of this invention is the provision of an o-ring which remains seated within an o-ring groove as fluid pressure forces the hydraulic pump to flow uphole from the o-ring collar.

A further object of this invention is the provision of an o-ring assembly fabricated to reduce breakage and loss of the o-ring from its o-ring groove.

Still another object of this invention is the provision of an o-ring which is bonded about one side of its entire circumference to a retainer, and which has a sway action as pressure is applied and removed therefrom.

Still a further object of this invention is the provision of an o-ring seal assembly in combination with a downhole pump and an o-ring collar which enjoys an extended life and which remains within the o-ring groove when damaged.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Figure 1:
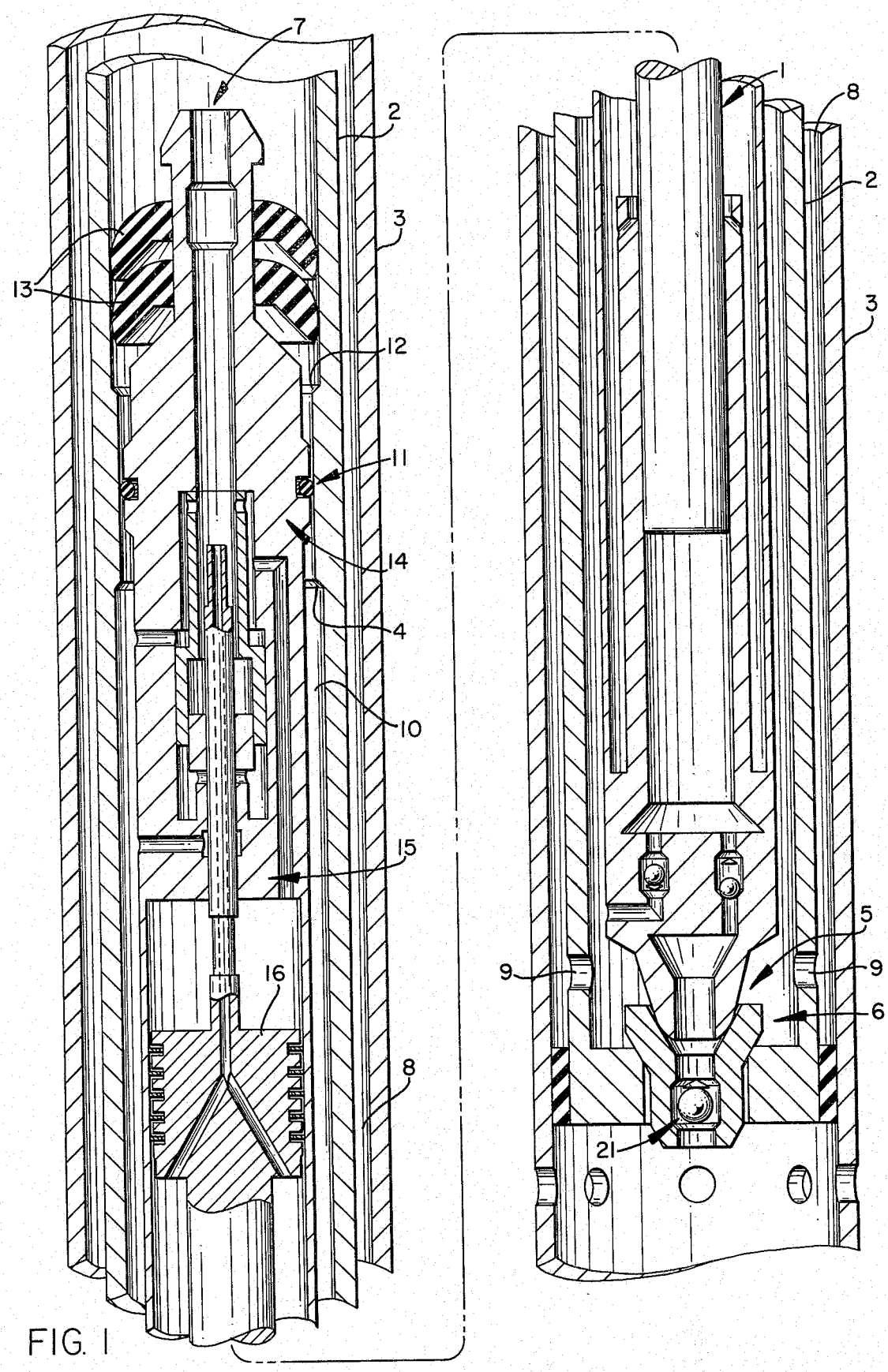
FIG. 1 is a broken, longitudinally cross-sectional view of a downhole pump having an o-ring seal assembly incorporated therein and made in accordance with the present invention.

FIG. 1 discloses a downhole pump of the free type within which the present invention has been properly incorporated. The specific downhole pump illustrated in FIG. 1 can take on several different forms and is shown for purposes of illustration only. As seen in FIG. 1, the pump is of a size to be received within the tubing 2. The tubing 2 is concentrically arranged respective to a casing 3 and extends downhole within the illustrated borehole so that fluid produced from a hydrocarbon containing zone can be forced by the pump 1 to the surface of the ground. An o-ring collar 4 circumferentially extends inwardly of the tubing and is spaced above the pump bottom plug 5 as illustrated. The bottom plug is received within a standing valve assembly 6 so that formation fluid can flow from a production zone, through the illustrated casing perforations, up through the standing valve, and into the pump bottom plug.

Power fluid is pumped from the surface of the ground, downhole through the tubing string, into a hollow fishing neck 7, and ultimately to the illustrated pump engine.

Casing annulus 8 receives flow from production outlet port 9 which communicates with pump annulus 10. O-ring assembly 11, made in accordance with the present invention, is received within the o-ring collar or o-ring connector 4. The collar terminates at 12. Cups 13 placed below the fishing neck and above the o-ring connector 14 enable the pump to be forced downhole into its operative configuration as illustrated in FIG. 1.

The pump includes an engine valve assembly 15 which controls the flow of power fluid to cause the engine piston 16 to reciprocate, thereby causing the pump section 1 to force formation fluid to move through the pump and uphole to the surface of the ground.

Figure 3:
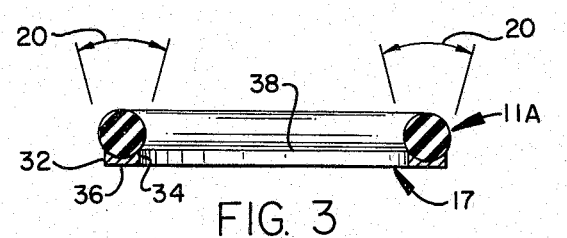
FIG. 3 is a cross-sectional view taken along line 3—3 of FIG. 5.
Figure 5:
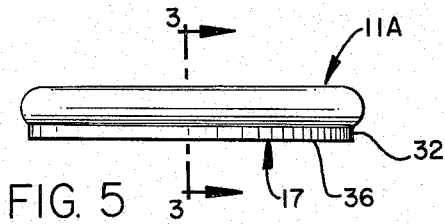
FIG. 5 is a side elevational view of part of the apparatus disclosed in FIGS. 3 and 6.
Figure 6:
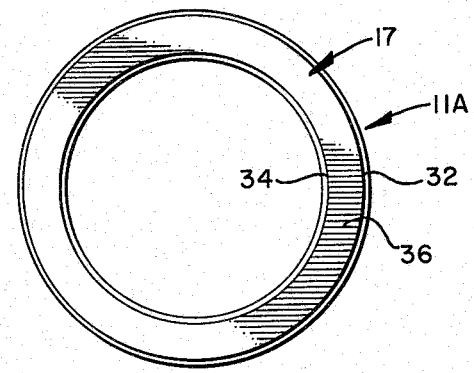
FIG. 6 is a bottom view of the apparatus disclosed in FIG. 3.

As seen illustrated in FIGS. 3, 5, and 6, an annular retainer member 17 in the form of a flat apertured disc, is bonded to a marginal sidewall of a resilient o-ring to provide an o-ring seal assembly 11A for use in the beforementioned o-ring groove.

Figure 4:
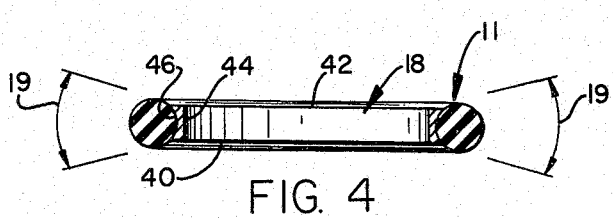
FIG. 4 is a cross-sectional view taken along line 4—4 of FIG. 7.
Figure 7:
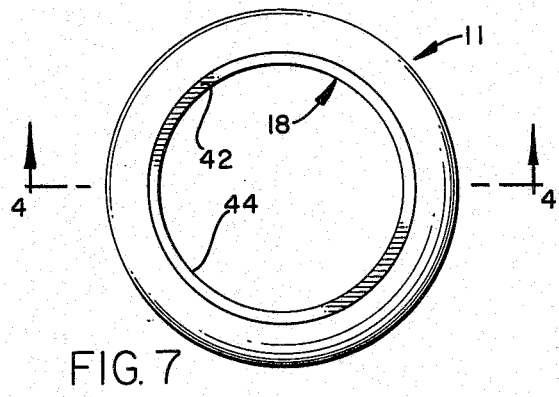
FIG. 7 is a bottom view of the apparatus disclosed in FIGS. 2 and 4.

As seen illustrated in FIGS. 4 and 7, the alternate embodiment of the invention includes a retainer member 18 in the form of a cylinder which has a concave outer annular face for receiving a circumferentially extending, inner annular face of the illustrated o-ring therewith, thereby providing an improved seal assembly for use in the beforementioned o-ring groove.

As seen in FIGS. 3 and 4, o-ring assembly 11 has a sway motion seen illustrated by numeral 19 while o-ring assembly 11A has a sway motion 20. The sway motion is determined by the relative thickness or width of the retainer member respective to the diameter of the body of the o-ring.

Figure 2:
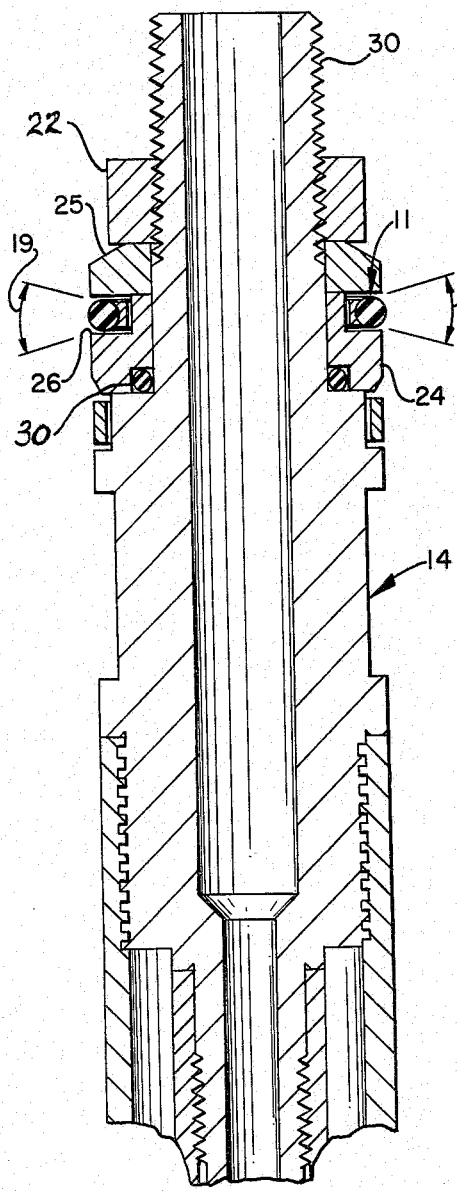
FIG. 2 is a detailed cross-sectional view of part of the apparatus disclosed in FIG. 1.

In FIG. 2, lock nut 22 threadedly engages the exterior of the upper marginal end of the upper sub and forces the first member 24 and second member 25 towards one another and against the illustrated shoulder of the sub. The first and second members cooperate together to form the illustrated o-ring groove which includes separable spaced walls 26 and 28.

A second o-ring 30 is seated within the illustrated smaller o-ring groove and abuttingly engages the shoulder of the sub, thereby preventing leakage of fluid between the i.d. of members 24 and 25.

The retainer 17 of the o-ring assembly 11A is provided with a circumferentially extending, continuous outer edge 32, an inner edge 34, a lower face 36 which is opposed to a concave upper face 38. The resilient o-ring is bonded to the continuous concave face 38. Preferably the o-ring is made of rubber while the retainer is made of metal, such as steel. The o-ring preferably is bonded to the concave face by vulcanization, using prior art technique.

In the embodiment of FIG. 4 the retainer has a lower edge 40 parallel and spaced from a top edge 42. The retainer is cylindrical in form and is provided with an inner wall surface 44 opposed to a concave continuous outer wall 46. The inner annular face of the o-ring is bonded to the concave annular wall of the retainer by vulcanization, although other suitable bonding expedients may be employed while remaining within the comprehension of this invention, if desired.

In operation the o-ring assembly is placed against the bottom of the o-ring groove of the first member 24 and the member is slid into the illustrated position of FIG. 2. The second member 25 is fitted into position and lock nut 22 securely fastens the assembly to the upper sub. The fishing neck and cups are next affixed to the upper end of the upper sub and the apparatus run downhole into the borehole.

As the downhole hydraulic pump is forced to flow into the illustrated position of FIG. 1, the o-ring 11 or 11A is compressed within its groove as the o-ring assembly is forcibly and slidably received within the o-ring collar. The o-ring assembly thereafter prevents leakage of power fluid from the upper tubing interior, across the pump, and into the lower tubing annulus 10.

The present invention therefore prevents the o-ring 11 and 11A from being forced or flowed from its groove. Moreover, should the o-ring of the present invention receive localized damage, it will not become dislodged from its groove merely because a small segment thereof has been damaged, but instead, the o-ring will be maintained in fixed relationship respective to its retainer and to the o-ring groove. Moreover, damage to the o-ring of the present invention does not result in bits and pieces thereof falling downhole into the pump intake because the entire circumferentially extending annular area thereof is bonded to the retainer and therefore cannot be separated therefrom. Accordingly, substantial maintenance costs are saved by the utilization of the present invention. Hence, the present invention provides a safety margin for the o-ring assembly used to seal off downhole pumps.

The pump of FIG. 1 is flowed downhole into seated relationship by employment of power fluid at 7 which forces the pump downward as the fluid below the pump is forced out through ports 9, into the casing annulus, and uphole to the surface of the ground.

The pump is flowed uphole by placing the surface control valve (not shown) in the pump-out position which allows high pressure power fluid to be supplied from the surface power source directly to the casing, downhole through the casing annulus 8, into port 9, and into the tubing annulus 10, whereupon the pressure acts upon the lower side of the o-ring assembly thereby forcing the pump to commence moving in an uphole direction until the o-ring assembly clears the upper end 12 of the o-ring collar. As the o-ring assembly leaves the o-ring collar at 12, the fluid under pressure below the o-ring during this upward movement of the pump has a tendency to flow the o-ring out of its groove, which often breaks o-rings of the prior art. As pointed out above, the present invention overcomes this deficiency of the prior art thereby achieving desirable results.

After the o-ring assembly has cleared the o-ring collar, the hydraulic pressure acts on the underside of cups 13 and flows the pump uphole to the surface of the ground.

Furthermore, it is sometimes necessary to alternately jar the pump up and down by alternately flowing the pump out of the o-ring collar and back into seated position to cause the standing valve assembly 21 to receive a jarring effect in order to unstick an inoperative valve assembly or to jar a temporarily inoperative engine piston 16. This action often causes o-rings of the prior art to break, thereby necessitating complete removal of the pump.

The o-ring 11 and 11A of this invention is preferably made of nitrile rubber, commonly referred to as buna-n which is a copolymer of butadiene and acrylonitrile. An o-ring made of buna-n is suitable for use in boreholes with temperatures ranging up to 300°.

The o-ring assembly of the present invention provides an additional safety margin towards preventing an o-ring from being forced out of position as it moves out of seated relationship respective to an o-ring collar. The present invention further prevents an o-ring from rolling as it moves inside the o-ring collar, and provides the unexpected advantage of retaining broken pieces properly positioned within the o-ring groove where it cannot fall into and damage the pump mechanism.

The o-ring also is designed to provide a sway action at different pressure values so that the o-ring can be properly received to provide an efficient seal within its groove and collar.

I claim:

1. In a pump assembly received downhole in a borehole wherein the pump has a main body, an o-ring seal assembly formed on the main body, an o-ring collar located downhole in the borehole for sealingly receiving the o-ring assembly therewithin, the improvement comprising:

said o-ring seal assembly includes a first and a second annular member which cooperate together to form an o-ring groove circumferentially disposed about said main body, one of said first and second annular members forming a sidewall of said groove and being removably affixed to said main body, the other of said first and second members forming the other sidewall and the bottom of said groove;

said o-ring assembly further includes a relatively thin annular retainer member having opposed relatively wide circumferentially extending faces; an o-ring having a continuous circumferentially extending face thereof bonded to one face of said retainer;

said o-ring and retainer being removably captured in close tolerance relationship within said o-ring groove in such a manner that the outermost side of the o-ring is free to sealingly engage the o-ring collar.

2. The improvement of claim 1 wherein said first member has a bottom and wall formed thereon, said second member has a wall formed thereon, said first and second members being removably affixed to said main body, and a second o-ring seal formed between said first member and said main body.

3. The improvement of claim 1 wherein said retainer member is in the form of an apertured disc having a flat bottom face and a concave upper face, said o-ring having a continuous circumferentially extending face thereof bonded to said concave upper face.

4. The improvement of claim 1 wherein said retainer member is in the form of a cylinder having an inner flat face and an outer concave face; said o-ring having a continuous circumferentially extending face thereof bonded to said concave outer face.

5. The improvement of claim 4 wherein said disc is metal and said o-ring is vulcanized thereto.

6. The improvement of claim 1 wherein said first member has a bottom and wall formed thereon, said second member has a wall formed thereon, said first and second members being removably affixed to said main body, and a second o-ring seal formed between said first member and said main body;

wherein said retainer member is in the form of an apertured disc having a flat bottom face and a concave upper face, said o-ring having a continuous circumferentially extending face thereof bonded to said concave upper face; and, wherein said disc is metal and said o-ring is vulcanized thereto.

7. A downhole pump, an o-ring collar, said pump being slidably received in sealed engagement within said o-ring collar, the combination with said collar and pump of an o-ring seal assembly;

said o-ring seal assembly includes a resilient o-ring, an annular retainer member, and mount means, including an o-ring groove, by which said o-ring seal assembly can be placed about said pump to dispose the outermost side of the o-ring in sealed engagement with the interior of the o-ring collar;

said retainer member includes an o-ring engaging face and an opposed face which engages a wall surface of the o-ring groove; said o-ring having a continuous, circumferentially extending annular face bonded to said o-ring engaging face of said retainer.

8. The combination of claim 7 wherein said retainer member is in the form of an apertured disc having a flat bottom face and a concave upper face, said o-ring having a continuous circumferentially extending face thereof bonded to said concave upper face.

9. The combination of claim 7 wherein said retainer member is in the form of a cylinder having an inner flat face and an outer concave face; said o-ring having a continuous circumferentially extending face thereof bonded to said concave outer face.

10. The combination of claim 7 wherein said disc is metal and said o-ring is vulcanized thereto.

11. The combination of claim 7 wherein said o-ring assembly includes a first annular member and a second annular member slidably received about said pump to cooperatively present said o-ring groove;

said first and second members being separable to separate said groove whereby said annular retainer and said resilient o-ring can be captured therewithin and disposed in seated relationship respective to the pump, first and second members, and the o-ring collar.

* * * * *